United States Patent
Lammers et al.

(10) Patent No.: US 10,029,562 B2
(45) Date of Patent: Jul. 24, 2018

(54) POWER TAKE-OFF ARRANGEMENT FOR WORK VEHICLE

(71) Applicant: Deere & Company, Moline, IL (US)

(72) Inventors: Eric T. Lammers, Cedar Falls, IA (US); David G. Reid, Cedar Falls, IA (US); Joel R. Brummer, Waterloo, IA (US); Brian E. Biles, Cedar Falls, IA (US); Roman Cisek, Cedar Falls, IA (US); Allan N. Schott, Reinbeck, IA (US)

(73) Assignee: Deere & Company, Moline, IL (US)

( * ) Notice: Subject to any disclaimer, the term of this patent is extended or adjusted under 35 U.S.C. 154(b) by 142 days.

(21) Appl. No.: 15/248,660

(22) Filed: Aug. 26, 2016

(65) Prior Publication Data
US 2018/0056782 A1     Mar. 1, 2018

(51) Int. Cl.
*B60K 17/28* (2006.01)
*F16H 3/54* (2006.01)
*B62D 49/06* (2006.01)

(52) U.S. Cl.
CPC .............. *B60K 17/28* (2013.01); *F16H 3/54* (2013.01); *B60Y 2200/221* (2013.01); *B62D 49/06* (2013.01); *F16H 2200/0034* (2013.01); *F16H 2200/2005* (2013.01); *F16H 2200/2033* (2013.01)

(58) Field of Classification Search
CPC ............ B60K 17/28; B60K 25/06; F16H 3/54
See application file for complete search history.

(56) References Cited

U.S. PATENT DOCUMENTS

| | | | |
|---|---|---|---|
| 2,958,225 | A | 11/1960 | Wagner |
| 3,122,025 | A | 2/1964 | Mark et al. |
| 4,388,843 | A | 6/1983 | Teeter |
| 4,722,234 | A | 2/1988 | Greene et al. |
| 4,920,813 | A | 5/1990 | Willford |
| 5,230,411 | A | 7/1993 | Nishida et al. |
| 5,528,949 | A | 6/1996 | Stainton et al. |

(Continued)

FOREIGN PATENT DOCUMENTS

| | | |
|---|---|---|
| CN | 103148210 | 4/2015 |
| EP | 0487861 A1 | 6/1992 |
| EP | 2675678 | 4/2016 |

OTHER PUBLICATIONS

German Patent and Trade Mark Office, Search Report for German Patent Application No. 10 2017 212 639.6 dated Mar. 23, 2018.

*Primary Examiner* — Faye M Fleming
(74) *Attorney, Agent, or Firm* — Lorenz & Kopf, LLP (57) ABSTRACT

A power take-off (PTO) transmission unit transfers power between an input shaft and an output shaft. A gear set selectively couples the input shaft to the output shaft. A shift device includes a shift rail with ends forming inner pistons within chambers. The shift rail is configured to translate between first, second, and third positions based on the pressures of the chambers. Inner pistons nest within the outer pistons in the chambers. A shift fork and shift collar translate with the shift rail to, in the first position, engage the gear set such that power is transferred at a first speed ratio; in the second position, engage the gear set such that power is transferred at a second speed ratio; and in the third position, engage the gear set to provide a neutral mode in which the output shaft is free to rotate relative to the input shaft.

20 Claims, 7 Drawing Sheets

(56) References Cited

U.S. PATENT DOCUMENTS

| | | | |
|---|---|---|---|
| 5,846,153 A | 12/1998 | Matsuoka | |
| 6,129,187 A | 10/2000 | Bellanger et al. | |
| 6,202,812 B1 | 3/2001 | Semke | |
| 6,428,447 B2 | 8/2002 | Onuki | |
| 6,454,041 B2 * | 9/2002 | Ishimori | A01B 71/06 180/312 |
| 6,595,299 B2 * | 7/2003 | Heller | A01B 59/043 172/272 |
| 7,431,108 B2 * | 10/2008 | Tarasinski | B60K 17/28 180/53.6 |
| 8,033,298 B2 | 10/2011 | Matsufuji | |
| 8,534,396 B2 | 9/2013 | Schulz et al. | |
| 8,783,124 B2 | 7/2014 | Rang et al. | |
| 8,996,214 B2 | 3/2015 | Ishii | |
| 9,233,607 B2 * | 1/2016 | Huber | B60W 30/1888 |
| 2010/0099533 A1 | 4/2010 | Horsfall et al. | |
| 2013/0283939 A1 | 10/2013 | Eknonen et al. | |
| 2017/0044736 A1 * | 2/2017 | Miyamoto | B60L 11/005 |
| 2017/0198768 A1 * | 7/2017 | Vora | F16D 48/066 |
| 2018/0056781 A1 * | 3/2018 | Lammers | B60K 17/28 |

\* cited by examiner

POWER TAKE-OFF ARRANGEMENT FOR WORK VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to work vehicles, and more specifically to power take-off arrangements for work vehicles.

BACKGROUND OF THE DISCLOSURE

Work vehicles (and other vehicles) may include onboard power sources to provide motive and other power during vehicle operation. For example, work vehicles such as tractors may include internal combustion engines that convert chemical energy to mechanical energy in order to facilitate execution of useful tasks. Certain vehicles, in addition to primary functionality (e.g., driving and hauling functionality), may be capable of secondary functionality, including through the use of attachable implements. For example, tractors may be outfitted with various implements (e.g., loaders, seeders, and so on) that may be attached to the vehicles in various ways (e.g., through front-end mounts, three-point hitches, and so on). Such implements may be configured to draw power from the associated vehicle via a power take-off arrangement in order to do useful work.

SUMMARY OF THE DISCLOSURE

The disclosure provides power take-off arrangements for work vehicles.

In one aspect, the disclosure provides a power take-off (PTO) transmission unit for transferring power between an input shaft coupled to a work vehicle and an output shaft coupled to an implement. The PTO transmission unit includes a housing at least partially defining a first chamber and a second chamber configured to be coupled to a fluid source for selectively pressurizing the first chamber and the second chamber. The unit further includes a gear set positioned within the housing and selectively coupling the input shaft to the output shaft and a shift device positioned within the housing. The shift device includes a shift rail with a first end forming a first inner piston within the first chamber and a second end forming a second inner piston within the second chamber. The shift rail is configured to translate between a first position, a second position, and a third position based on the pressures of the first and second chambers. The shift device further includes a first outer piston arranged within the first chamber such that the first inner piston nests within the first outer piston and a second outer piston arranged within the second chamber such that the second inner piston nests within the second outer piston; a shift fork coupled to and translating with the shift rail; and a shift collar coupled to and translating with the shift fork to, in the first position, engage the gear set such that power is transferred from the input shaft to the output shaft at a first speed ratio, in the second position, engage the gear set such that power is transferred from the input shaft to the output shaft at a second speed ratio, and in the third position, engage the gear set to provide a neutral mode in which the output shaft is free to rotate relative to the input shaft.

In another aspect, the disclosure provides a power take-off (PTO) arrangement for transferring power between a work vehicle and an implement. The arrangement includes a housing at least partially defining a first chamber and a second chamber; a fluid source configured to selectively supply fluid to pressurize the first chamber and the second chamber; an input shaft at least partially extending into the housing and configured to be driven by the work vehicle; an output shaft at least partially extending into the housing; a PTO shaft coupled to the output shaft and configured to be rotationally coupled to the implement; a gear set positioned within the housing and selectively coupling the input shaft to the output shaft; a clutch device coupled to the gear set and configured to, upon engagement, transfer power from the output shaft to the gear set; a brake device coupled to the gear set and configured to, upon engagement, restrict movement of the at least a portion of the gear set and a shift device. The shift device includes a shift rail with a first end forming a first inner piston within the first chamber and a second end forming a second inner piston within the second chamber. The shift rail is configured to translate between a first position, a second position, and a third position based on the pressures of the first and second chambers. The shift device further includes a first outer piston arranged within the first chamber such that the first inner piston nests within the first outer piston and a second outer piston arranged within the second chamber such that the second inner piston nests within the second outer piston; a shift fork coupled to, and translating with, the shift rail; and a shift collar coupled to, and translating with the shift fork to selectively engage the gear set based on the first, second, and third positions of the shift rail. The arrangement further includes a controller coupled to the clutch, the brake, and the fluid source to selectively operate in at least a first mode, a second mode, and a third mode. In the first mode, the clutch is engaged, the brake is disengaged, and the shift rail is in the first position such that power is transferred from the work vehicle to the implement at a first speed ratio. In the second mode, the clutch is engaged, the brake is disengaged, and the shift rail is in the second position such that power is transferred from the work vehicle to the implement at a second speed ratio. In the third mode, the clutch is disengaged, the brake is engaged, and the shift rail is in the third position such that the output shaft is free to rotate relative to the input shaft and the brake.

In yet another aspect, the disclosure provides a work vehicle with a power system; a propulsion system driven by the power system to move the work vehicle; and a power take-off (PTO) arrangement driven by the power system and configured to provide power to an implement attached to the work vehicle. The PTO arrangement includes a housing at least partially defining a first chamber and a second chamber; a fluid source configured to selectively supply fluid to pressurize the first chamber and the second chamber; an input shaft at least partially extending into the housing and configured to be driven by the work vehicle; an output shaft at least partially extending into the housing; a PTO shaft coupled to the output shaft and configured to be rotationally coupled to the implement; a gear set positioned within the housing and selectively coupling the input shaft to the output shaft; a clutch device coupled to the gear set and configured to, upon engagement, transfer power from the output shaft to the gear set; a brake device coupled to the gear set and configured to, upon engagement, restrict movement of the at least a portion of the gear set; and a shift device. The shift device includes a shift rail with a first end forming a first inner piston within the first chamber and a second end forming a second inner piston within the second chamber, the shift rail configured to translate between a first position, a second position, and a third position based on the pressures of the first and second chambers; a first outer piston arranged within the first chamber such that the first inner piston nests within the first outer piston and a second outer piston arranged within the second chamber such that the second inner piston nests within the second outer piston; a shift fork coupled to, and translating with, the shift rail; and a shift collar coupled to, and translating with the shift fork to selectively engage the gear set based on the first, second, and third positions of the shift rail. The work vehicle further includes a controller coupled to the clutch, the brake, and the fluid source to selectively operate in at least a first mode, a second mode, and a third mode. In the first mode, the clutch is engaged, the brake is disengaged, and the shift rail is in the first position such that power is transferred from the work vehicle to the implement at a first speed ratio. In the second mode, the clutch is engaged, the brake is disengaged, and the shift rail is in the second position such that power is transferred from the work vehicle to the implement at a second speed ratio. In the third mode, the clutch is disengaged, the brake is engaged, and the shift rail is in the third position such that the output shaft is free to rotate relative to the input shaft and the brake.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed power take-off arrangement, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C). Furthermore, in detailing the disclosure, terms of direction and orientation, such as "forward," "aft," "lateral," "horizontal," and "vertical" may be used. Such terms are defined, at least in part, with respect to the direction in which the work vehicle travels during use. Further, the discussion below may reference a cylindrical coordinate system with "axial," "radial," and "circumferential" orientations relative to a longitudinal axis.

For various reasons, it may be desirable for a work vehicle to provide power to an associated implement, such as an implement towed or pushed by the work vehicle. Generally, a power take-off (PTO) arrangement is provided to transfer power from an input shaft coupled to the power system of the work vehicle to an output shaft that, in turn, transfers power to the implement. At times, an operator may desire to directly manipulate the implement, such as by moving the implement or folding up portions of the implement. Such manipulation may turn the PTO shaft and output shaft, and in conventional approaches, the torque applied to the PTO shaft may be undesirably transferred to the input shaft in a manner contrary to typical operation such that the manipulation may encounter resistance and result in operator concern. To address this issue, among others, the examples described herein provide a PTO arrangement with a neutral mode in which the PTO shaft is decoupled from the input shaft and any other components of the PTO arrangement that may otherwise cause resistance to implement manipulation.

Figure 1:
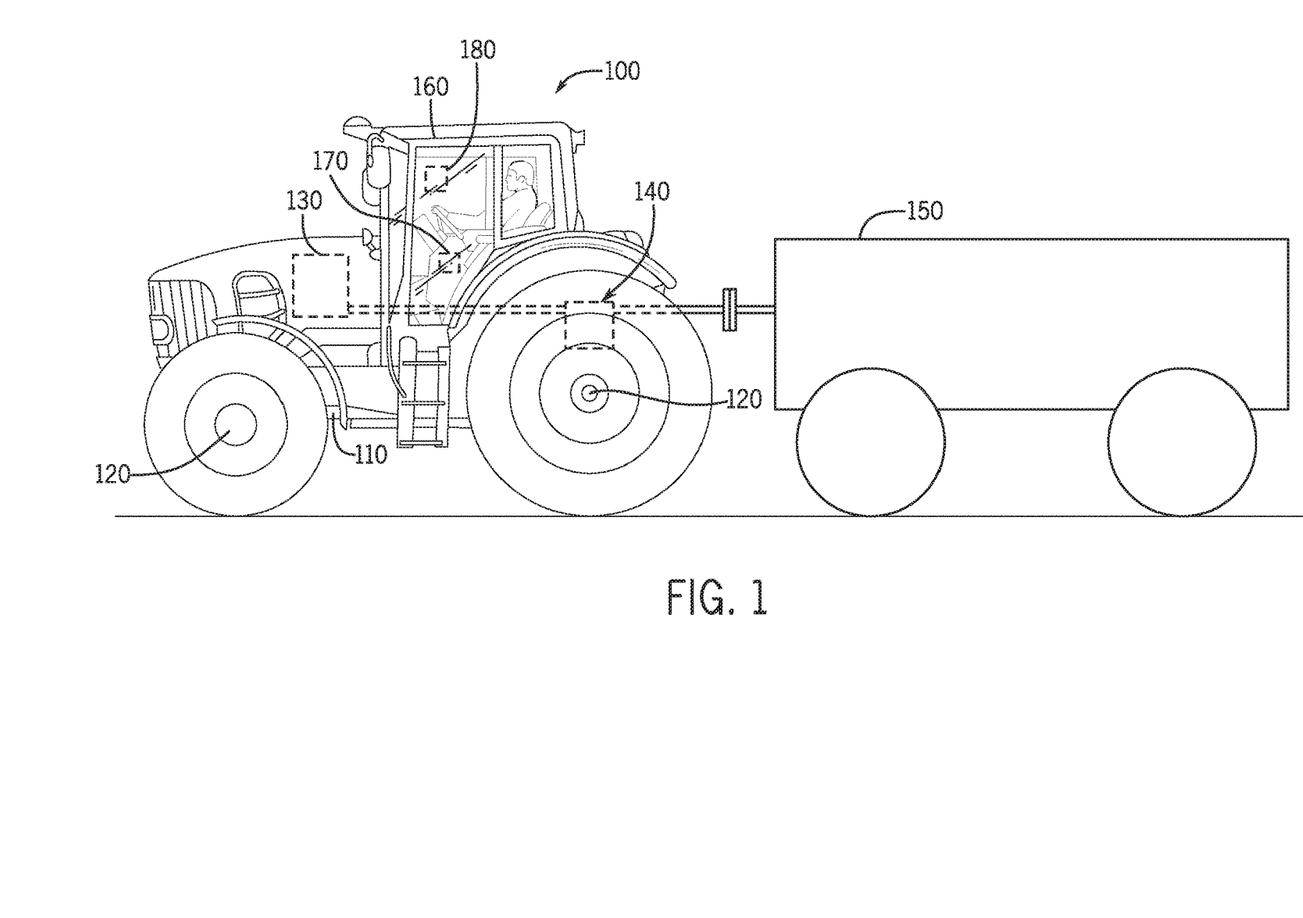
FIG. 1 is a side view of an example work vehicle in the form of an agricultural tractor with a power take-off arrangement that may be used in accordance with this disclosure.

Referring to FIG. 1, the disclosed embodiments may be used in an arrangement in which work vehicle 100, shown as an agricultural tractor, utilizes an accessory component or implement 150. Generally, the examples described herein are applicable to any type of work vehicle 100 and/or implement 150. Examples of work vehicles 100 include tractors, trucks, loaders, and the like. Examples of implements 150 include mowers, seeders, winches, pumps, blowers, booms, and the like.

As shown, the work vehicle 100 may be considered to include a main frame or chassis 110, a propulsion drive assembly 120, a power system 130, a power take-off (PTO) arrangement 140, and an operator platform or cabin 160. In this example, the work vehicle 100 further includes a controller 170 and an operator interface 180.

As is typical, the cabin 160 is mounted to the chassis 110 and houses the operator that controls operation of the work vehicle 100 via the controller 170 and operator interface 180. The power system 130 includes a power source (e.g., an internal combustion engine, a fuel cell, an electric motor, and/or a hybrid-gas electric motor) used for propulsion of the work vehicle 100 via the propulsion drive assembly 120, as well as the auxiliary functions described below.

During operation, the operator may desire to provide auxiliary power for driving the implement 150 to perform a task. As such, the PTO arrangement 140 is provided to transfer power between the power system 130 and the implement 150. In one example, the PTO arrangement 140 includes a housing with a transmission unit, an input shaft that extends out of the housing, and an output shaft that also extends out of the housing. The input shaft is rotationally coupled to the power system 130 and is further directly or indirectly drivingly connected to the output shaft within the housing by a gear set of the transmission unit such that the power from the input shaft may be transferred to the output shaft. The implement 150 is drivingly connected to the output shaft via a PTO shaft to receive and utilize this power. Moreover, the PTO arrangement 140 may include a clutch to engage and disengage the drive connection between the input shaft and the output shaft, and a brake device to prevent rotation during certain situations.

In one example, the PTO arrangement 140 enables power transfer between the work vehicle 100 and implement 150 according to at least three modes. The three modes correspond to a relatively high speed output mode, a relatively low speed output mode, and powered neutral mode. In the high speed output mode, the PTO arrangement 140 transfers power to the implement 150 at a relatively high speed ratio. In the low speed output mode, the PTO arrangement 140 transfers power to the implement 150 at a relatively low speed ratio. In the neutral mode, the PTO shaft is decoupled from the input shaft and any other components of the PTO arrangement 140 that may otherwise cause resistance to implement manipulation at the output shaft. Such conditions may be desirable to enable manual manipulation of the attachment (e.g., folding up or moving various aspects of the implement 150) without turning off the work vehicle 100. In one example, the first speed may be 1300 RPM and the second speed may be 1000 RPM, although in other examples, the output speed may be different, including an example with a speed of 540 RPM. Additional details about the PTO arrangement 140 will be provided with reference to FIGS. 2-7.

The controller 170 has one or more control elements to control various aspects of the operation of the work vehicle 100 and/or implement 150 and is configured to implement the functions described herein. The controller 170 may be configured as a computing device with associated processor devices and memory architectures, as a hard-wired computing circuit (or circuits), as a programmable circuit, as a hydraulic, electrical or electro-hydraulic controller, or otherwise. As such, the controller 170 may be configured to execute various computational and control functionality. In some embodiments, the controller 170 may be configured to receive input signals in various formats (e.g., as hydraulic signals, voltage signals, current signals, and so on), and to output command signals in various formats (e.g., as hydraulic signals, voltage signals, current signals, mechanical movements, and so on). The controller 170 may communicate with other systems or devices (including other controllers) in various known ways, including via a bus, via wireless or hydraulic communication means, or otherwise. An example location for the controller 170 is depicted in FIG. 1. It will be understood, however, that other locations are possible including other locations on the work vehicle 100, or various remote locations.

In some embodiments, controller 170 may be configured to receive input commands and to interface with the operator via the operator interface (or human-machine interface) 180, which may be disposed inside the cabin 160 of the work vehicle 100 for convenient access by the operator. The operator interface 180 may be an input device and an output device and configured in a variety of ways. In some embodiments, the operator interface 180 may include one or more joysticks, various switches or levers, one or more buttons, a touchscreen interface that may be overlaid on a display, a keyboard, a speaker, a microphone associated with a speech recognition system, or various other human-machine interface devices.

As such, during operation of the work vehicle 100 and/or implement 150, the operator selects the appropriate mode for power transfer via the operator interface 180. As introduced above, such modes may include a high speed output mode, a low speed output mode, and a neutral mode. Other selections or modes may be provided, such as an economy selection or "off." The operator interface 180 communicates with the controller 170 to implement the selection. As examples, the controller 170 generates appropriate commands to the power system 130 and one or more components of the PTO arrangement 140, including a clutch device, a brake device, and a shift device, to provide the appropriate output at the implement 150. In some situations, mode selection may be made automatically by the controller 170 based on operating conditions. Additional details about the PTO arrangement 140 are provided below.

Figure 2:
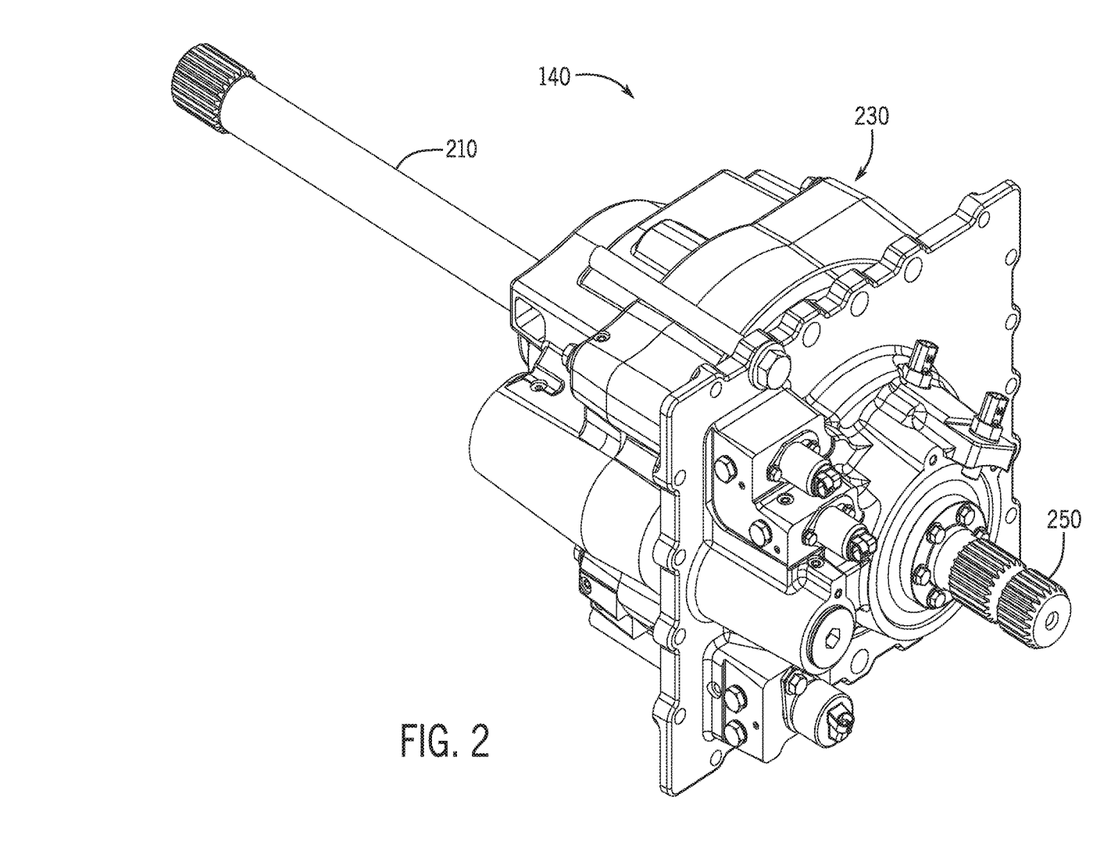
FIG. 2 is a perspective view of the power take-off arrangement shown in FIG. 1 in accordance with an example embodiment.

FIG. 2 is a perspective view of the PTO arrangement 140 shown in FIG. 1 in accordance with an example embodiment. In this example, the PTO arrangement 140 includes an input shaft 210 that may be splined connected to the drive shaft or transmission of the power system 130 and a PTO shaft 250 with spline connection for coupling with the implement 150. A PTO transmission unit 230 functions to selectively couple the input shaft 210 to the PTO shaft 250 for power transfer, as described in greater detail below. As noted above, the transmission unit 230 functions to receive power in the form of torque from the input shaft 210 and transfer the power to the PTO shaft 250 at one of least two speeds. The transmission unit 230 also enables a neutral mode in which the PTO shaft 250 and the input shaft 210 are decoupled from one another, as well as decoupled from other components in the transmission unit 230 that would otherwise restrict movement of the PTO shaft 250, such as a brake device.

Figure 3:
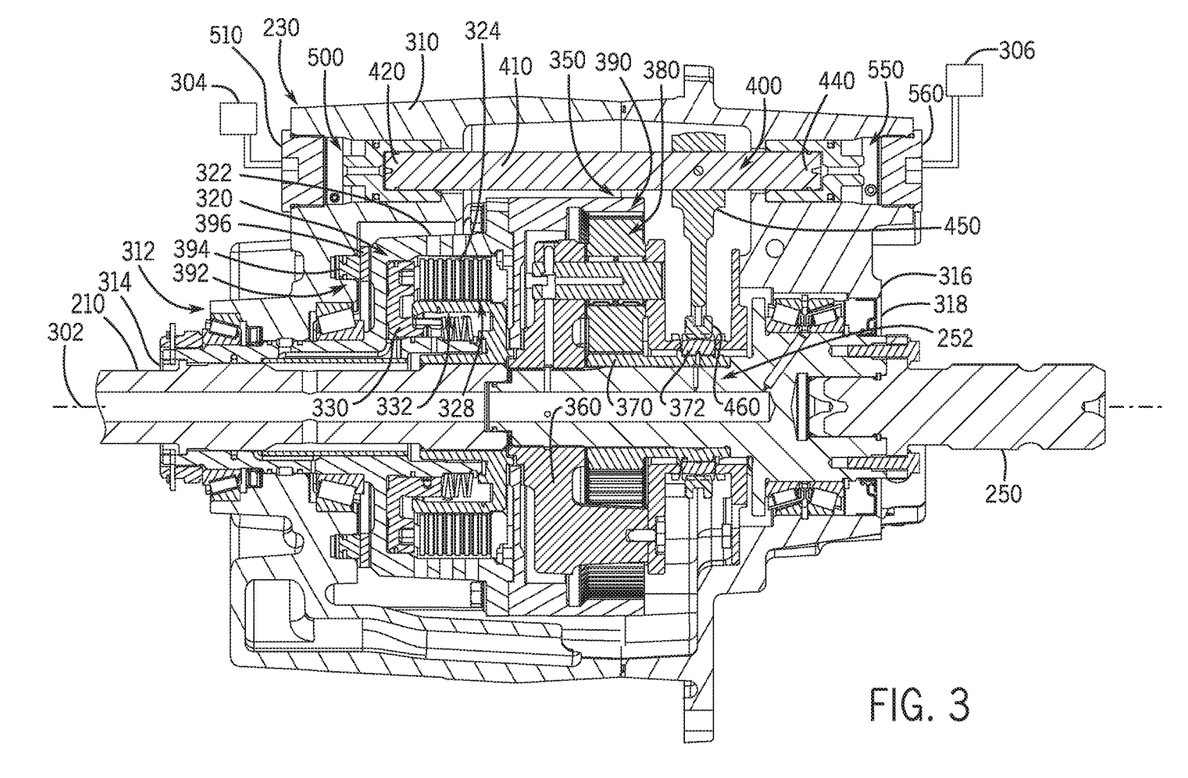
FIG. 3 is a cross-sectional view of a transmission unit of the power take-off arrangement shown in FIG. 1 in accordance with an example embodiment.

FIG. 3 is a cross-sectional view of the transmission unit 230 of the PTO arrangement 140 shown in FIG. 1 in accordance with an example embodiment. The transmission unit 230 generally includes a housing 310 that at least partially encloses and supports the working components. The housing 310 includes a first face or side 312 that defines a bore 314 through which the input shaft 210 extends and a second face or side 316 that defines a bore 318 through which the PTO shaft 250 extends. As described in greater detail below, the input shaft 210 is selectively coupled to or decoupled from the PTO shaft 250 via a clutch device 320, a planetary gear set 350, and an output shaft 252. The shafts 210, 250, 252, as well as other components of the transmission unit 230, may be mounted with bearings that enable rotation relative to housing 310.

The clutch device 320 is arranged within the housing 310 and includes a clutch drum 322 mounted to the planetary gear set 350 and a clutch hub 332 supported by drum 322 and driven by input shaft 210. Friction plates 324 extend from the clutch drum 322 and are interleaved with cooperating friction plates 328 extending from the clutch hub 332. The clutch device 320 further includes an actuation arrangement 330 to place the clutch device 320 in an engaged condition in which the two sets of plates 324, 328 are urged together to rotationally fix the clutch hub 332 and the input shaft 210 to the clutch drum 322 and the planetary gear set 350 or a disengaged condition in which the two sets of plates 324, 328 are urged apart to separate the clutch hub 332 and the input shaft 210 from the clutch drum 322 and the planetary gear set 350. Any suitable actuation arrangement 330 may be provided. As an example, the actuation arrangement 330 may include a spring element that urges the friction plates 324, 328 apart to disengage the clutch drum 322 from the clutch hub 332 and hydrualuic piston plate that is actuated by a pressure source (not shown) to urge the friction plates 324, 328 together. As a result of this arrangement, when the clutch device 320 is engaged, torque is transferred from the input shaft 210 to the planetary gear set 350 to drive the output shaft 252, which in turn is rotationally fixed to drive the PTO shaft 250. In this example, the clutch device 320 is integrated into the transmission unit 230. However, in other examples, the clutch device 320 may be moved to another part of the work vehicle 100.

The planetary gear set 350 includes a planet carrier 360, a sun gear 370, a set of planet gears 380, and a ring gear 390. Generally, the set of planet gears 380 includes a number of planet gears (e.g., three, one of which is shown) with teeth that engage corresponding teeth on an outer circumference of the sun gear 370 and corresponding teeth on an inner circumference of the ring gear 390. The planet gears 380 are supported by the planet carrier 360. The planet carrier 360 includes a central opening for mounting, and rotationally fixing, the planet carrier 360 on the output shaft 252. In this example, the planet carrier 360 has an axis 302 generally coincident to the axis of the input shaft 210, the output shaft 252, and the PTO shaft 250. The output shaft 252 also extends through the sun gear 370 and has a first end supporting planet carrier 360 and a second end with splines that rotationally fix the the output shaft 252 and planet carrier 360 to the PTO shaft 250. The planet carrier 360 extends radially to each of the planet gears 380. As such, the planet carrier 360 is coupled to the center of each of the planet gears 380 such that the planet gears 380 revolve around the sun gear 370.

As described in greater detail below, the planet carrier 360, the sun gear 370, and housing 310 include features such as toothed collars that enable a shift device 400 to rotationally fix the sun gear 370 and the planet carrier 360, rotationally fix the sun gear 370 and the housing 310, or rotationally de-couple the sun gear 370 from both the planet carrier 360 and the housing 310.

In one example, the ring gear 390 extends about and engages the planet gears 380 for rotation. As previously noted, upon engagement of the clutch device 320, power is transferred from the input shaft 210 to the planetary gear set 350. The planetary gear set 350 further includes a brake device 392 on the ring gear 390 that restricts movement of the ring gear 390 when engaged, typically when the implement 150 (FIG. 1) is not operating, such as when the PTO arrangement 140 is off or operating in a neutral mode. In one example, the brake device 392 includes a pressure or friction plate 396 that is urged against the clutch drum 322 by a hydraulically actuated brake piston 394. As such, the brake device 392 acts upon the clutch drum 322, which in turn is fixed to the ring gear 390, such that the brake device 392 restricts movement of the ring gear 390 when engaged. Although not shown, the brake device 392 may further include a spring or other mechanism for releasing the friction plate 396 when the brake piston 394 is no longer actuated.

A shift device 400 is provided to fix or release various components of the planetary gear set 350 such that the power is transferred at one of two designated speed ratios or such that power is not transferred. Generally, the shift device 400 includes a shift rail 410, a shift fork 450, and a shift collar 460. The ends 420, 440 of the shift rail 410 extend into respective chambers 500, 550 formed in the housing 310. As described in greater detail below, the chambers 500, 550 enable limited axial movement of the shift rail 410 while restricting radial movement. The position of shift device 400 is controlled by pressurizing one or both of the chambers 500, 550. As described below, when chamber 550 is pressurized and chamber 500 is not pressurized (e.g., vented), the shift rail 410 is translated into a first position; when chamber 500 is pressurized and chamber 550 is not pressurized, the shift rail 410 is translated into a second position; and when both chambers 500, 550 are pressurized, the shift rail 410 is translated into a third position. The fluid (e.g., typically oil) for pressurizing the chambers 500, 550 is provided via one or more pressure sources 304, 306 through internal passages in housing 310, based on commands from the controller 170 (FIG. 1), and end caps 394, 396 partially seal the chambers 390, 392. Any suitable mechanism for pressurizing and venting the chambers 500, 550 may be provided. Additional components facilitating this function may be provided, such as pumps, valves, conduits, and the like. Additional details about the translation of the shift rail 410 relative to the housing 310 and other components of the transmission unit 230 are provided below.

One end of the shift fork 450 is secured to the shift rail 410 and the other end engages the shift collar 460 such that the shift fork 450 and the shift collar 460 axially translate (or slide) with the shift rail 410. As a result of this arrangement, the shift rail 410 is selectively translated to appropriately position the shift collar 460 into one of the three positions introduced above. In the first position, the shift collar 460 engages features on the planet carrier 360 and the sun gear 370 to rotationally fix the planet carrier 360 with the sun gear 370. In the second position, the shift collar 460 engages features on the sun gear 370 and the housing 310 to rotationally fix the sun gear 370 to the housing 310 to effectively restrict rotation of the sun gear 370 (e.g., to "ground" the sun gear 370). In the third position, the shift collar 460 is "neutral" and is positioned on a shift hub 372 mounted about the sun gear 370 and does not rotationally fix the sun gear 370 to the housing 310 or the planet carrier 360. Additional details about the operational result of each of these positions will now be provided with reference to FIG. 4.

Figure 4:
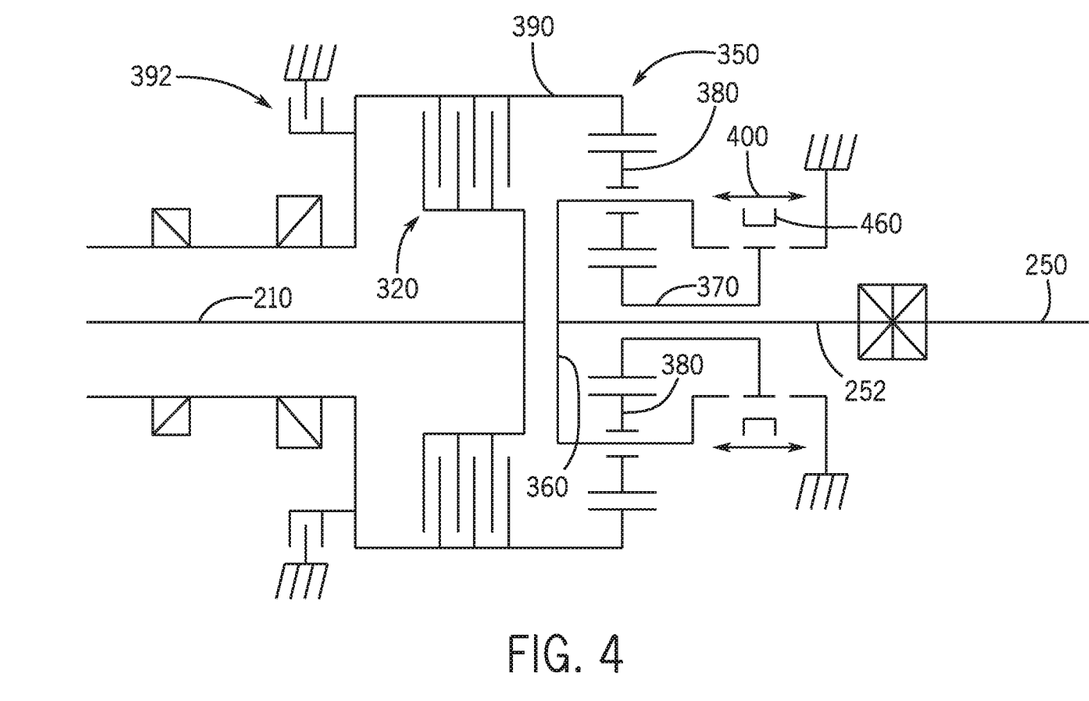
FIG. 4 is a simplified schematic diagram of the transmission unit shown in FIG. 3 in accordance with an example embodiment.

FIG. 4 is a simplified schematic diagram of the transmission unit 230 shown in FIG. 3 in accordance with an example embodiment. In particular, FIG. 4 schematically depicts the functional relationship between the input shaft 210, the clutch device 320, the planetary gear set 350, the brake device 392, the shift collar 460 of the shift device 400, the output shaft 252, and the PTO shaft 250. As previously noted, the shift device 400 may be commanded to shift between the first position, the second position, and the third or neutral position to respectively operate in the first speed output mode, the second speed output mode, and the neutral mode.

Upon selection of the low speed output mode, the shift device 400 is moved into the first position such that the shift collar 460 engages features on the planet carrier 360 and the sun gear 370 to rotationally fix the planet carrier 360 with the sun gear 370. When the clutch device 320 is engaged, torque from the input shaft 210 is transferred to the planetary gear set 350. Since the sun gear 370 is rotationally fixed to the planet carrier 360, as a unit, the ring gear 390, the planet gears 380, and the sun gear 370 are locked together for rotation about an effective diameter equal to that of the input shaft 210. As such, the planetary gear set 350 drives the output shaft 252 and PTO shaft 250 at a first speed that is approximately equal to the speed of the input shaft 210.

Upon selection of the low speed output mode, the shift device 400 is moved into the second position such that the shift collar 460 rotationally fixes the sun gear 370 to the housing 310. When the clutch device 320 is engaged, torque from the input shaft 210 is transferred to the planetary gear set 350. Since the sun gear 370 is fixed to the housing 310, the sun gear 370 is stationary, and torque from the input shaft 210 is transferred to the ring gear 390 to drive the planet gears 380 and the planet carrier 360 about the sun gear 370. As such, the ring gear 390 turns at the speed of the input shaft 210 and the planet gears 380 revolve around the fixed sun gear 370, and because of different gear ratios, the carrier 360 rotates at a different, reduced speed than the ring gear 390. At this reduced ratio, the planetary gear set 350 drives the output shaft 252 and the PTO shaft 250 at a second speed that is less than the first speed (and less than the speed of the input shaft 210).

Figure 5:
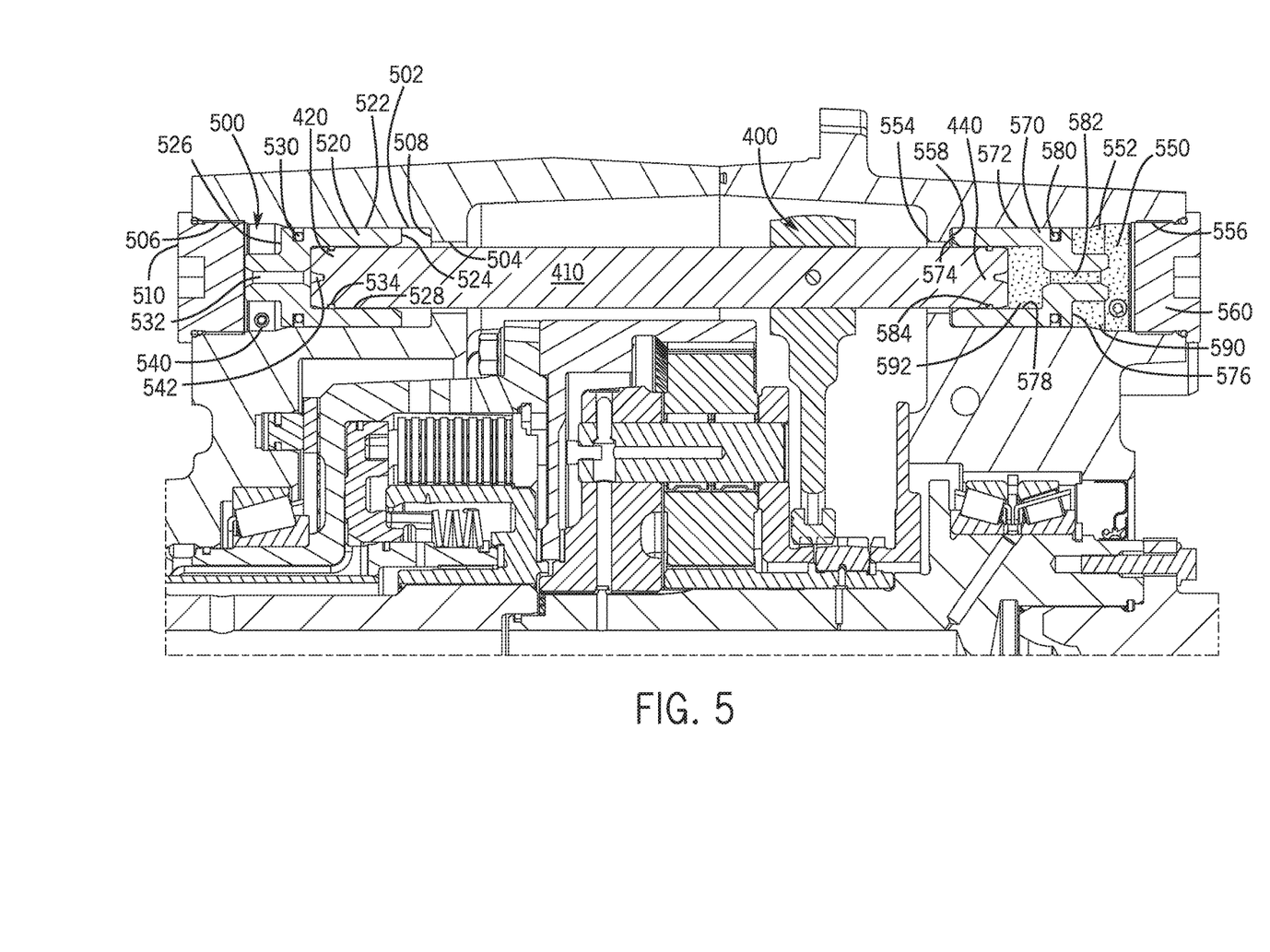
FIG. 5 is a partial, more detailed cross-sectional view of the transmission unit shown in FIG. 3 with a shift device in a first position in accordance with an example embodiment.
Figure 6:
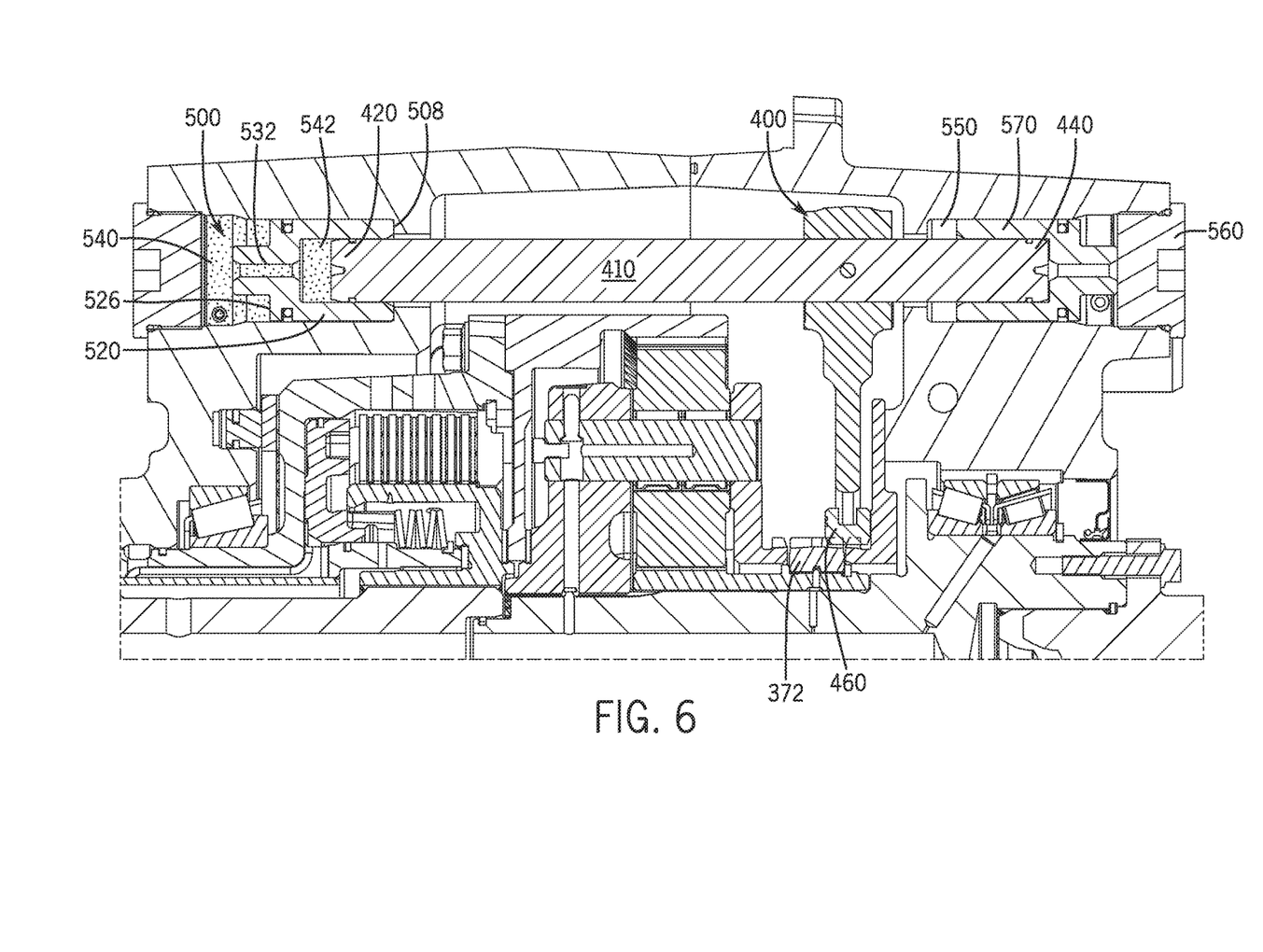
FIG. 6 is a partial, more detailed cross-sectional view of the transmission unit shown in FIG. 3 with the shift device in a second position in accordance with an example embodiment.
Figure 7:
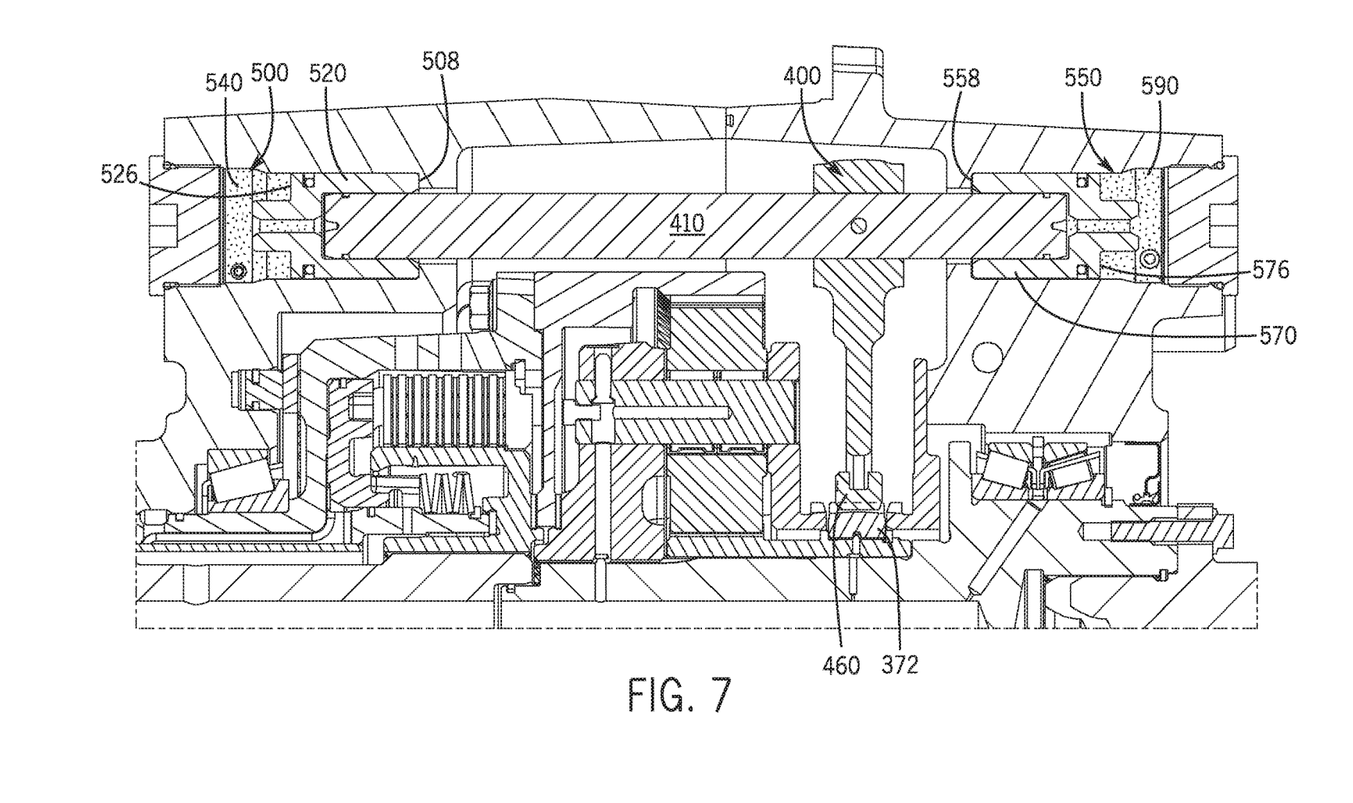
FIG. 7 is a partial, more detailed cross-sectional view of the transmission unit shown in FIG. 3 with the shift device in a third position in accordance with an example embodiment.

Upon selection of the third mode, the shift collar 460 is moved into the third position in which the sun gear 370 engages neither the planet carrier 360 nor the housing 310. This is a neutral position in which the sun gear 370 and planet carrier 360 are free to rotate relative to one another. Typically, in this mode, the clutch device 320 is disengaged such that power is not transferred between the input shaft 210 and the planetary gear set 350. Moreover, in the third mode, the brake device 392 is engaged to prevent rotation of the ring gear 390. However, since the sun gear 370 and the planet carrier 360 are free to rotate, the output shaft 252 and PTO shaft 250 are also free to rotate without resistance from the brake device 392 engaging the ring gear 390. This enables manipulation of the output shaft 252 and PTO shaft 250 without resistance from the brake device 392 or the input shaft 210. Further details about the structure and actuation of the shift device 400 will now be provided with reference to FIGS. 5-7. Although a planetary gear set 350 is depicted, other gear arrangements may be provided, such as a parallel-axis gear set that uses one countershaft and two gear pairs to achieve similar gear ratios. Similarly, other configurations of the input shaft 210, the clutch device 320, the planetary gear set 350, the output shaft 252, PTO shaft 250, and the shift device 400 may be provided Generally, FIGS. 5-7 are partial, more detailed cross-sectional views of the transmission unit 230 shown in FIG. 3 with the shift device 400 in the first position (FIG. 5), in the second position (FIG. 6), and in the third position (FIG. 7). As shown in each of FIGS. 5-7, the ends 420, 440 of the shift rail 410 of the shift device 400 are respectively retained in chambers 500, 550 such that the shift rail 410 translates in an axial direction based on the fluid pressure in the respective chambers 500, 550. Referring initially to the chamber 500 on the left side, a generally cylindrical chamber wall 502 is bounded on either axial end by an inner bore 504 and an outer bore 506. The first end 420 of the shift rail 410 extends through the inner bore 504 into the chamber 500. The inner bore 504 includes a stop 508 facing the chamber 500. The chamber 500 is sealed at the outer bore 506 by end cap 510. The second chamber 550 is similar and includes a generally cylindrical cavity wall 552 bounded on either end by an inner bore 554 and an outer bore 556. The second end 440 of the shift rail 410 extends through the inner bore 554 and partially within the chamber 550. The inner bore 554 includes a stop 558 facing the chamber 550. The chamber 550 is sealed at the outer bore 556 by end cap 560.

Each end 420, 440 of the shift rail 410 may be considered a piston and will be referred to as such. Each of the pistons 420, 440 are respectively nested into an additional piston 520, 570 within the chambers 500, 550. In view of the relative positions, pistons 420, 440 may be considered the inner (or smaller) pistons and pistons 520, 570 may be considered the outer (or larger) pistons.

Each of the outer pistons 520, 570 may be considered to have an exterior cylindrical surface 522, 572, a first end face 524, 574 a second end face 526, 576, and an interior cylindrical surface 528, 578. A seal 530, 580 may be provided between the exterior cylindrical surface 522, 572 and the chamber wall 502, 552 to prevent fluid from passing between the exterior cylindrical surface 522, 572 and the chamber wall 502, 552, while enabling the outer piston 520, 570 to axially translate within the chamber 500, 550. Each of second end faces 526, 576 has a passage 532, 582 that enables fluid to pass through the outer pistons 520, 570.

As previously noted, the inner pistons 420, 440 are nested within the outer pistons 520, 570. In particular, the first end faces 524, 574 and interior cylindrical surfaces 528, 578 are sized to receive the inner pistons 420, 440. A fluid seal 534, 584 may be formed between the cylindrical surfaces of the inner pistons 420, 440 to prevent the passage of fluid therebetween while enabling relative axial movement between the inner pistons 420, 440 and the outer pistons 520, 570.

As result of this arrangement, sub-chambers 540, 542; 590, 592 may formed within the chambers 500, 550 based on the relative positions of the pistons 420, 520; 440, 570. In particular, in chamber 500, a first (or outer) sub-chamber 540 is formed between the end cap 510 and the second end face 526 of the outer piston 520. Also in chamber 500, a second (or inner) sub-chamber 542 is formed between the inner piston 420 and the interior cylindrical surface 528 of the outer piston 520. The two sub-chambers 540, 542 are fluidly coupled together by the passage 532 through the second end face 526. Similarly, in chamber 550, a first (or outer) sub-chamber 590 is formed between the end cap 560 and the second end face 576 of the outer piston 570. Also in chamber 550, a second (or inner) sub-chamber 592 is formed between the inner piston 440 and the interior cylindrical surface 578 of the outer piston 570. The two sub-chambers 590, 592 are fluidly coupled together by the passage 582 through the second end face 576.

As particularly shown in FIG. 5, the shift device 400 is translated into the first position by pressurizing the chamber 550 and venting the chamber 500 such that the shift rail 410 is translated to the left, in this example. In particular, fluid is provided to the sub-chamber 590 such that pressure is applied to the end face 576 of the outer piston 570 to urge the outer piston 570 to the left until encountering stop 558 that limits axial movement of the outer piston 570 in that direction. Fluid also passes through the passage 582 in the outer piston 570 into sub-chamber 592 and applies pressure to the inner piston 440. Upon engagement of the outer piston 570 and stop 558, the pressure in sub-chamber 592 separates the inner piston 440 and the outer piston 570 to continue urging the shift rail 410 to the left. As the chamber 550 is pressurized and the shift rail 410 is urged to the left, the inner piston 420 in the chamber 500 is also urged to the left and engages the outer piston 520 to similarly move the outer piston 520 to the left. The inner piston 420 and outer piston 520 translate to the left until the outer piston 520 engages the end cap 510, which restricts further movement of the shift rail 410 in that direction. As previously noted, in this position, the shift rail 410 positions the shift fork 450 and shift collar 460 such that the sun gear 370 is rotationally fixed relative to the planet carrier 360, thereby enabling power transfer from the input shaft 210 to the output shaft 252 at the relatively high speed ratio.

As particularly shown in FIG. 6, the shift device 400 is translated into the second position by pressurizing chamber 500 and venting chamber 550 such that the shift rail 410 is translated to the right. In particular, fluid is provided to the sub-chamber 540 such that pressure is applied to the end face 526 of the outer piston 520 to urge the outer piston 520 to the right until encountering stop 508 that limits axial movement of the outer piston 520 in that direction. Fluid also passes through the passage 532 in the outer piston 520 into sub-chamber 542 and applies pressure to the inner piston 420. Upon engagement of the outer piston 520 and stop 508, the pressure in sub-chamber 542 separates the inner piston 420 and the outer piston 520 to continue urging the shift rail 410 to the right. As the chamber 500 is pressurized and the shift rail 410 is urged to the right, the inner piston 440 in the chamber 550 is also urged to the right and engages the outer piston 570 to similarly move the outer piston 570 to the right. The inner piston 440 and outer piston 570 translate to the right until the outer piston 570 engages the end cap 560, which restricts further movement of the shift rail 410 in that direction. As previously noted, in this position, the shift rail 410 positions the shift fork 450 and shift collar 460 to rotationally fix the sun gear 370 relative to the housing 310 such that the planet gears 380 revolve around the sun gear 370, thereby enabling power transfer from the input shaft 210 to the output shaft 252 at the relatively low speed ratio.

As particularly shown in FIG. 7, the shift device 400 is translated into the third or neutral position by pressurizing chamber 500 and chamber 550 such that the shift rail 410 is translated into an intermediate position. In particular, fluid is provided to the sub-chamber 540 such that pressure is applied to the end face 526 of the outer piston 520 to urge the outer piston 520 to the right until encountering stop 508 that limits axial movement of the outer piston 520 in that direction. Simultaneously, fluid is provided to the sub-chamber 590 such that pressure is applied to the end face 576 of the outer piston 570 to urge the outer piston 570 to the left until encountering stop 558 that limits axial movement of the outer piston 520 in that direction. Since equal pressures are supplied to each chamber 500, 550, the shift rail 410 is maintained in this intermediate position. In other words, the pressure in chamber 590 is such that the fluid in sub-chamber 540 of chamber 500 does not flow into sub-chamber 542 to urge the inner piston 420, and thus the shift rail 410, to the right; and similarly, pressure in chamber 540 is such that the fluid in sub-chamber 590 of chamber 550 does not flow into sub-chamber 592 to urge the inner piston 440, and thus the shift rail 410, to the left. In one example, upon loss of pressure in a respective position, the shift rail 410 will maintain that position.

Accordingly, in one the example, a PTO arrangement is provided with an integrated clutch and a two-speed planetary gear drive that allows for the output shaft to rotate at two different PTO speeds. The arrangement employs a planetary gear combination that achieves a relatively small reduction in gear ratio (e.g., 1.3 to 1), while allowing for coaxial input/output power flow through the assembly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A power take-off (PTO) transmission unit for transferring power between an input shaft coupled to a work vehicle and an output shaft coupled to an implement, the PTO transmission unit comprising:
   a housing at least partially defining a first chamber and a second chamber configured to be coupled to a fluid source for selectively pressurizing the first chamber and the second chamber;
   a gear set positioned within the housing and selectively coupling the input shaft to the output shaft; and
   a shift device positioned within the housing and comprising:
      a shift rail with a first end forming a first inner piston within the first chamber and a second end forming a second inner piston within the second chamber, the shift rail configured to translate between a first position, a second position, and a third position based on the pressures of the first and second chambers;
      a first outer piston arranged within the first chamber such that the first inner piston nests within the first outer piston and a second outer piston arranged within the second chamber such that the second inner piston nests within the second outer piston;
      a shift fork coupled to and translating with the shift rail; and
      a shift collar coupled to and translating with the shift fork to,
         in the first position, engage the gear set such that power is transferred from the input shaft to the output shaft at a first speed ratio,
         in the second position, engage the gear set such that power is transferred from the input shaft to the output shaft at a second speed ratio, and
         in the third position, engage the gear set to provide a neutral mode in which the output shaft is free to rotate relative to the input shaft.

2. The PTO transmission unit of claim 1, further comprising a clutch device arranged within the housing and coupled to the gear set, the clutch device having an engaged condition in which power is transferred from the output shaft to the gear set and a disengaged condition in which the output shaft is rotationally decoupled relative to the gear set.

3. The PTO transmission unit of claim 2, further comprising a brake device arranged within the housing and coupled to the gear set, the brake device configured to, upon engagement, restrict movement of at least a portion of the gear set.

4. The PTO transmission unit of claim 3, further a controller coupled to the clutch, the brake, and the fluid source to selectively operate in at least a first mode, a second mode, and a third mode;
 wherein, in the first mode, the clutch is engaged, the brake is disengaged, and the shift rail is in the first position;
 wherein, in the second mode, the clutch is engaged, the brake is disengaged, and the shift rail is in the second position; and
 wherein, in the third mode, the clutch is disengaged, the brake is engaged, and the shift rail is in the third position.

5. The PTO transmission unit of claim 4, wherein the gear set is a planetary gear set comprising a sun gear, planet gears engaging the sun gear, a planet carrier supporting the planet gears and rotationally fixed to the output shaft; and a ring gear engaging the planet gears; and
 wherein, in the first position, the shift collar fixes the sun gear to the planet carrier;
 wherein, in the second position, the shift collar fixes the sun gear to the housing; and
 wherein, in the third position, the shift collar disengages the sun gear from the planet carrier and from the housing.

6. The PTO transmission unit of claim 5, wherein the planet carrier, the input shaft, and the output shaft have coincident longitudinal axes.

7. The PTO transmission unit of claim 1, wherein the shift rail is translated into the first position by pressurizing the second chamber and venting the first chamber and into the second position by pressurizing the first chamber and venting the second chamber.

8. The PTO transmission unit of claim 7, wherein the shift rail is translated into the third position by pressurizing the first chamber and second chamber.

9. The PTO transmission unit of claim 8, wherein the first chamber is at least partially formed by a first end cap and a first stop and the second chamber is at least partially formed by a second end cap and a second stop; and
 wherein, in the first position, the first outer piston engages the first end cap, the first inner piston engages the first outer piston, the second outer piston engages the second stop, and the second inner piston separates the second outer piston;
 wherein, in the second position, the first outer piston engages the first stop, the first inner piston separates from the first outer piston, the second outer piston engages the second end cap, and the second inner piston engages the second outer piston; and
 wherein the third position, the first outer piston engages the first stop, the first inner piston engages the first outer piston, the second outer piston engages the second end stop, and the second inner piston engages the second outer piston.

10. A power take-off (PTO) arrangement for transferring power between a work vehicle and an implement, comprising:
 a housing at least partially defining a first chamber and a second chamber;
 a fluid source configured to selectively supply fluid to pressurize the first chamber and the second chamber;
 an input shaft at least partially extending into the housing and configured to be driven by the work vehicle;
 an output shaft at least partially extending into the housing;
 a PTO shaft coupled to the output shaft and configured to be rotationally coupled to the implement;
 a gear set positioned within the housing and selectively coupling the input shaft to the output shaft;
 a clutch device coupled to the gear set and configured to, upon engagement, transfer power from the output shaft to the gear set;
 a brake device coupled to the gear set and configured to, upon engagement, restrict movement of the at least a portion of the gear set;
 a shift device comprising:
  a shift rail with a first end forming a first inner piston within the first chamber and a second end forming a second inner piston within the second chamber, the shift rail configured to translate between a first position, a second position, and a third position based on the pressures of the first and second chambers;
  a first outer piston arranged within the first chamber such that the first inner piston nests within the first outer piston and a second outer piston arranged within the second chamber such that the second inner piston nests within the second outer piston;
  a shift fork coupled to, and translating with, the shift rail; and
  a shift collar coupled to, and translating with the shift fork to selectively engage the gear set based on the first, second, and third positions of the shift rail; and
 a controller coupled to the clutch, the brake, and the fluid source to selectively operate in at least a first mode, a second mode, and a third mode;
 wherein, in the first mode, the clutch is engaged, the brake is disengaged, and the shift rail is in the first position such that power is transferred from the work vehicle to the implement at a first speed ratio;
 wherein, in the second mode, the clutch is engaged, the brake is disengaged, and the shift rail is in the second position such that power is transferred from the work vehicle to the implement at a second speed ratio; and
 wherein, in the third mode, the clutch is disengaged, the brake is engaged, and the shift rail is in the third position such that the output shaft is free to rotate relative to the input shaft and the brake.

11. The PTO arrangement of claim 10, wherein the clutch is integrated into the housing.

12. The PTO arrangement of claim 11, wherein the brake device is integrated into the housing.

13. The PTO arrangement of claim 10, wherein the gear set is a planetary gear set comprising a sun gear, planet gears engaging the sun gear, a planet carrier supporting the planet gears and rotationally fixed to the output shaft, and a ring gear engaging the planet gears, and
 wherein, in the first position, the shift collar fixes the sun gear to the planet carrier;
 wherein, in the second position, the shift collar fixes the sun gear to the housing; and
 wherein, in the third position, the shift collar disengages the sun gear from the planet carrier and from the housing.

14. The PTO arrangement of claim 13, wherein the planet carrier, the input shaft, and the output shaft have coincident longitudinal axes.

15. The PTO arrangement of claim 10, wherein the shift rail is translated into the first position by pressurizing the second chamber and venting the first chamber and into the second position by pressurizing the first chamber and venting the second chamber.

16. The PTO transmission unit of claim 10, wherein the shift rail is translated into the third position by pressurizing the first chamber and second chamber.

17. The PTO arrangement of claim 16, wherein the first chamber is at least partially formed by a first end cap and a first stop and the second chamber is at least partially formed by a second end cap and a second stop; and
   wherein, in the first position, the first outer piston engages the first end cap, the first inner piston engages the first outer piston, the second outer piston engages the second stop, and the second inner piston separates the second outer piston;
   wherein, in the second position, the first outer piston engages the first stop, the first inner piston separates from the first outer piston, the second outer piston engages the second end cap, and the second inner piston engages the second outer piston; and
   wherein the third position, the first outer piston engages the first stop, the first inner piston engages the first outer piston, the second outer piston engages the second end stop, and the second inner piston engages the second outer piston.

18. A work vehicle, comprising:
   a power system;
   a propulsion system driven by the power system to move the work vehicle;
   a power take-off (PTO) arrangement driven by the power system and configured to provide power to an implement attached to the work vehicle, the PTO arrangement comprising:
      a housing at least partially defining a first chamber and a second chamber;
      a fluid source configured to selectively supply fluid to pressurize the first chamber and the second chamber;
      an input shaft at least partially extending into the housing and configured to be driven by the work vehicle;
      an output shaft at least partially extending into the housing;
      a PTO shaft coupled to the output shaft and configured to be rotationally coupled to the implement;
      a gear set positioned within the housing and selectively coupling the input shaft to the output shaft;
      a clutch device coupled to the gear set and configured to, upon engagement, transfer power from the output shaft to the gear set;
      a brake device coupled to the gear set and configured to, upon engagement, restrict movement of at least a portion of the gear set;
      a shift device comprising:
         a shift rail with a first end forming a first inner piston within the first chamber and a second end forming a second inner piston within the second chamber, the shift rail configured to translate between a first position, a second position, and a third position based on the pressures of the first and second chambers;
         a first outer piston arranged within the first chamber such that the first inner piston nests within the first outer piston and a second outer piston arranged within the second chamber such that the second inner piston nests within the second outer piston;
         a shift fork coupled to, and translating with, the shift rail; and
         a shift collar coupled to, and translating with the shift fork to selectively engage the gear set based on the first, second, and third positions of the shift rail; and
      a controller coupled to the clutch, the brake, and the fluid source to selectively operate in at least a first mode, a second mode, and a third mode;
      wherein, in the first mode, the clutch is engaged, the brake is disengaged, and the shift rail is in the first position such that power is transferred from the work vehicle to the implement at a first speed ratio;
      wherein, in the second mode, the clutch is engaged, the brake is disengaged, and the shift rail is in the second position such that power is transferred from the work vehicle to the implement at a second speed ratio; and
      wherein, in the third mode, the clutch is disengaged, the brake is engaged, and the shift rail is in the third position such that the output shaft is free to rotate relative to the input shaft and the brake.

19. The work vehicle of claim 18, wherein the clutch and the brake device are integrated into the housing.

20. The work vehicle of claim 18, wherein the gear set is a planetary gear set comprising a sun gear, planet gears engaging the sun gear, a planet carrier supporting the planet gears and rotationally fixed to the output shaft, and a ring gear engaging the planet gears; and
   wherein, in the first position, the shift collar fixes the sun gear to the planet carrier;
   wherein, in the second position, the shift collar fixes the sun gear to the housing; and
   wherein, in the third position, the shift collar disengages the sun gear from the planet carrier and from the housing.

* * * * *

UNITED STATES PATENT AND TRADEMARK OFFICE
CERTIFICATE OF CORRECTION

PATENT NO. : 10,029,562 B2
APPLICATION NO. : 15/248660
DATED : July 24, 2018
INVENTOR(S) : Lammers et al.

Page 1 of 1

It is certified that error appears in the above-identified patent and that said Letters Patent is hereby corrected as shown below:

In Column 13, in Claim 8, Line 39, after "and" insert -- the --.

In Column 13, in Claim 9, Line 54, delete "wherein the" and insert -- wherein, in the --, therefor.

In Column 15, in Claim 16, Line 6, after "and" insert -- the --.

In Column 15, in Claim 17, Line 21, delete "wherein the" and insert -- wherein, in the --, therefor.

Signed and Sealed this
Eleventh Day of December, 2018

Andrei Iancu
*Director of the United States Patent and Trademark Office*